United States Patent [19]

Lyons et al.

[11] Patent Number: 5,300,842

[45] Date of Patent: Apr. 5, 1994

[54] FLUX/CURRENT AIR GAP ESTIMATION METHOD FOR ACTIVE MAGNETIC BEARINGS

[75] Inventors: James P. Lyons; Mark A. Preston, both of Niskayuna, N.Y.

[73] Assignee: General Electric Company, Schenectady, N.Y.

[21] Appl. No.: 970,196

[22] Filed: Nov. 2, 1992

[51] Int. Cl.⁵ .......................... H02K 7/09; G01B 7/14
[52] U.S. Cl. ................. 310/90.5; 324/207.13
[58] Field of Search ................ 310/90.5, 68 B; 324/207.15, 207.13, 207.16

[56] References Cited

U.S. PATENT DOCUMENTS

| | | | |
|---|---|---|---|
| 4,504,098 | 3/1985 | Battarel et al. | 310/90.5 |
| 4,629,262 | 12/1986 | Hamilton | 310/90.5 |
| 4,652,820 | 3/1987 | Maresca | 310/90.5 X |
| 5,003,211 | 3/1991 | Groom | 310/90.5 |
| 5,036,236 | 7/1991 | Wilson | 310/90.5 |
| 5,051,637 | 9/1991 | Harris et al. | 310/90.5 |

*Primary Examiner*—Emanuel T. Voeltz
*Assistant Examiner*—E. To
*Attorney, Agent, or Firm*—Jill M. Breedlove; Marvin Snyder

[57] ABSTRACT

In an active magnetic bearing system employing radial or thrust bearings, rotor shaft position is determined without requiring air gap position sensors, resulting in a high reliability system. The flux paths for each respective electromagnetic force actuator of the active magnetic bearing are isolated in order to minimize the magnetic coupling therebetween. The active magnetic bearing system is controlled for mutually exclusive excitation of each of the two actuators (e.g., stator pole pairs) per control axis. A sequence of test voltage pulses is applied to the unexcited one of each actuator pole-pair. At the peak of an applied test voltage pulse, after a predetermined time interval, the pole flux linkage is estimated using either an analog or software integrator. The integrator is reset at zero current, and hence zero flux, thereby avoiding accumulation of errors. The effective air gap length is determined from the inherent magnetization characteristic of the magnetic bearing using the measured current and the estimated flux linkage. Effectively, each magnetic pole is used alternately for force actuation and for inductive feedback sensing, eliminating the need for separate position sensors.

10 Claims, 4 Drawing Sheets

BEARING AXES

FLUX/CURRENT AIR GAP ESTIMATION METHOD FOR ACTIVE MAGNETIC BEARINGS

RELATED PATENT APPLICATIONS

This application is related to commonly assigned U.S. patent application Ser. No. 07/970,197 of J. P. Lyons, M. A. Preston and G. B. Kliman and to commonly assigned U.S. patent application Ser. No. 07/970,194 of M. A. Preston and J. P. Lyons, both filed concurrently herewith and incorporated by reference herein.

FIELD OF THE INVENTION

The present invention relates generally to active magnetic bearings and, more particularly, to a method of determining the rotor shaft position in an active magnetic bearing without requiring air gap position sensors.

BACKGROUND OF THE INVENTION

Active magnetic bearings have great potential for improving the efficiency of rotating machinery by: reducing or eliminating the complexity of bearing lubrication systems; enabling high rotational speeds; and providing active means of controlling vibrations in complex rotating masses. Recent advances in power electronics and control microprocessors have made active magnetic bearing systems feasible in, for example, gas turbine engine applications.

Presently, however, active magnetic bearings are unsuitable for high-reliability applications, such as aircraft engine rotor support and vibration control. A major problem is lack of accuracy and reliability of air gap position sensors used for determining rotor shaft position. Hence, it is desirable to provide a method for determining rotor gap position in an active magnetic bearing system, without requiring separate air gap position sensors.

SUMMARY OF THE INVENTION

In an active magnetic bearing system employing radial or thrust bearings, rotor shaft position is determined without requiring air gap position sensors, resulting in a high reliability system. The flux paths for each respective electromagnetic force actuator of the active magnetic bearing (e.g., comprising a stator pole-pair in a radial magnetic bearing) are isolated in order to minimize the magnetic coupling therebetween. In this way, the current (or magnetomotive force, mmf) in each respective actuator pole-pair is functionally related to the flux therethrough, independent of the currents (or mmf's) in adjacent actuator pole-pairs. Each actuator pole-pair at 180° separation comprises a single control axis for the magnetic bearing system.

According to the air gap estimation method of the present invention, the active magnetic bearing system is controlled for mutually exclusive excitation of each of the two actuators per control axis. A sequence of test voltage pulses is applied to the unexcited one of each actuator pole-pair. At the peak of an applied test voltage pulse, after a predetermined time interval, the pole flux linkage is estimated using either an analog or software integrator. The test voltage pulses are designed to return to zero during each cycle, so that the pole current, and hence pole flux, return to zero. The integrator is thus reset at zero flux, advantageously preventing error accumulation. The effective air gap length is determined from the inherent magnetization characteristic of the magnetic bearing using the measured current and the estimated flux linkage. Effectively, therefore, each magnetic pole is used alternately for force actuation and for inductive feedback sensing, advantageously eliminating the need for separate position sensors.

BRIEF DESCRIPTION OF THE DRAWINGS

The features and advantages of the present invention will become apparent from the following detailed description of the invention when read with the accompanying drawings in which:

FIG. 1b graphically represents magnetically isolated control axes for the active magnetic bearing of FIG. 1a;

FIG. 4 is a graphical representation of air gap length versus current and magnetic flux linkage for an active magnetic bearing such as that of FIG. 1a.

DETAILED DESCRIPTION OF THE INVENTION

Figure 1A:
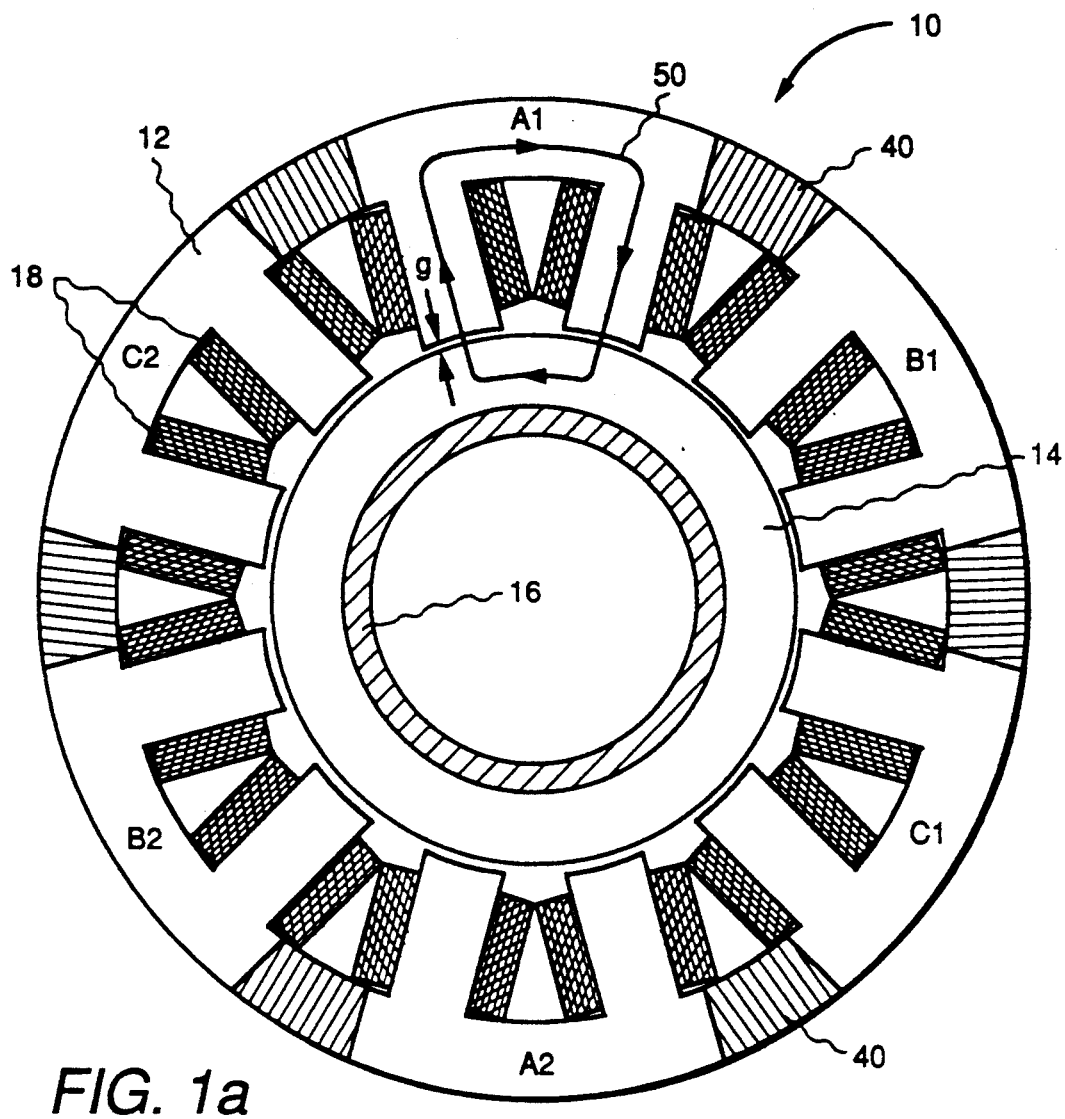
FIG. 1a is a front, partially cross sectional, view of an active radial magnetic bearing having isolated magnetic actuators in accordance with the present invention.

FIG. 1 illustrates a fault-tolerant active radial magnetic bearing 10, such as described in commonly assigned U.S. patent application Ser. No. 07/970,197 of J. P. Lyons, M. A. Preston and G. B. Kliman, cited hereinabove.

Figure 1B:
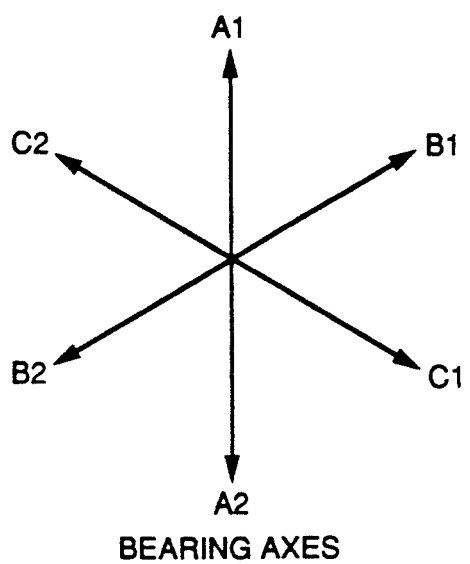

Magnetic bearing 10 includes a stator 12 and a rotor 14 mounted for rotation within stator 12 and coupled to a shaft 16. Each stator pole has a winding 18 wound thereon in well-known manner. By way of illustration, magnetic bearing 10 of FIG. 1a has three radial control axes, as indicated in FIG. 1b. In particular, stator 12 has twelve electromagnetic stator poles configured as six force-producing pole pairs A1, B1, C1, A2, B2, and C2, with a 60° radial spacing between pole-pairs. Two pole-pairs at 180° radial separation operate as a respective one of the control axes.

Stator 12 is segmented by situating a non-magnetic stator flux barrier 40 between adjacent pole-pairs. The stator flux barriers 40 provide magnetic isolation for each pole-pair and thus allow functioning force-actuation pole-pairs to continue operating even in such close proximity to faulted magnetic poles. Advantageously, any two of the three (or more) control axes are sufficient to maintain rotor suspension in the bearing system. Hence, bearing operation continues even in the presence of faults, such as, for example, faulted magnetic poles, power electronic shorts, and phase power loss. Even greater fault tolerance may be achieved using more than three control axes.

In operation, the magnetic flux produced by the forcing current or magnetomotive force (mmf) in each pole winding 18 circulates through the stator poles of each respective pole pair and through the rotor and stator cores, crossing two air gap lengths g. An exemplary magnetic flux path 50 for pole-pair A1 is illustrated in FIG. 1.

Figure 2:
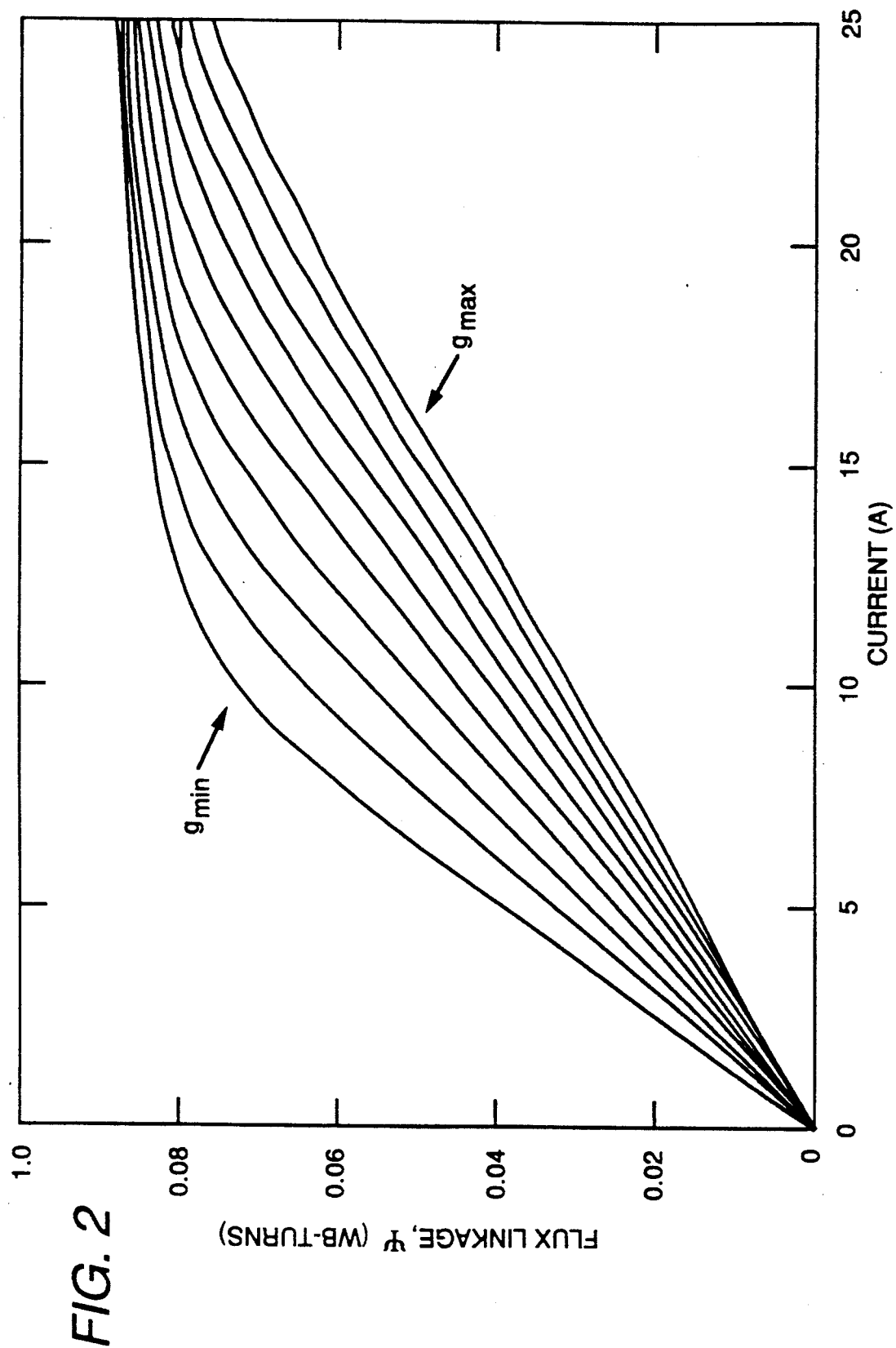
FIG. 2 is a graphical illustration of the magnetic characteristic of a force actuator pole-pair of an active radial magnetic bearing such as that of FIG. 1.

FIG. 2 graphically illustrates typical magnetization characteristics (i.e., flux versus current) at various gap lengths for an exemplary force actuator. At low current levels, the magnetization characteristic is dominated by the reluctance of the air gap, and lower flux per unit current (inductance) is achieved at the larger air gaps. The curves become non-linear at relatively high excitation current levels due to effects of magnetic saturation.

Figure 3:
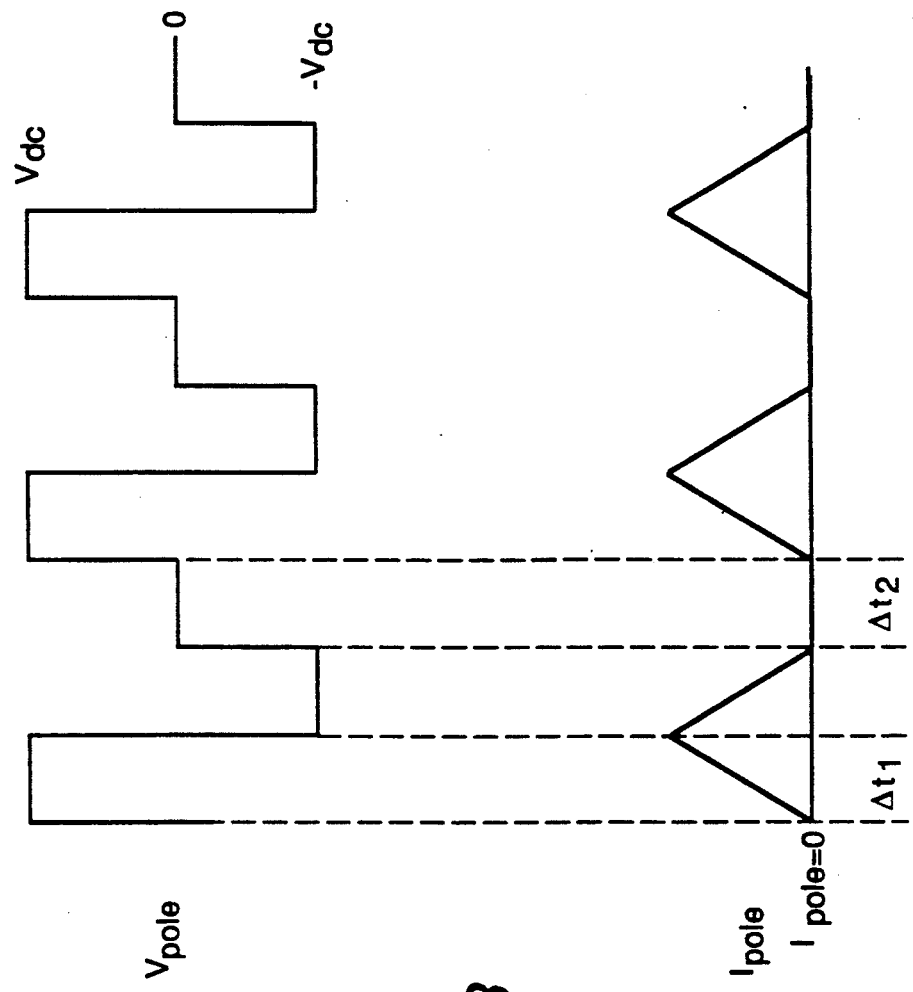
FIG. 3 is a graphical representation of a test voltage pulse applied to a stator pole-pair and the resulting stator pole current in the active radial magnetic bearing of FIG. 1 in accordance with the air gap position estimation method of the present invention.

In accordance with the present invention, the active bearing system of FIG. 1 is controlled for mutually exclusive excitation of each of the two actuators (i.e., stator pole-pairs) per control axis. Hence, at any time, there is one unexcited actuator per axis. A sequence of test voltage pulses is applied to the unexcited actuator of each pair. FIG. 3 illustrates a sequence of test voltage pulses V and the resulting stator pole current $I_{pole}$.

After an interval $\Delta t_1$, at the peak of an applied test voltage pulse, the pole flux linkage $\psi$ is estimated according to:

$$\psi = \int (V_{pole} - I_{pole}R)dt,$$

where $V_{pole}$ represents the respective pole voltage, $I_{pole}$ represents the respective pole current, and R represents the winding resistance. Advantageously, with the test voltage pulse V designed to return to zero each cycle, such as the test voltage illustrated in FIG. 3, the pole current, and hence flux, returns to zero each cycle. Hence, the integrator used to perform the integration set forth hereinabove is reset at zero flux, thereby preventing error accumulation.

The integrator can be implemented in either software or analog circuits in well-known manner, as desired. In particular, in an analog implementation, an estimate of flux linkage is made by measuring pole voltage and current, and integrating according to the hereinabove equation. On the other hand, in a software implementation, pole voltage samples are taken, and flux linkage $\psi$ is inferred therefrom according to the integral equation rewritten in digital form as:

$$\psi = V_{pole}\Delta t_1 - I_{avg}R\Delta t_1,$$

where $I_{avg}$ represents the average pole current. For either implementation, the integrator is reset at zero current, i.e., zero flux, and accumulation of errors is avoided.

Figure 4:
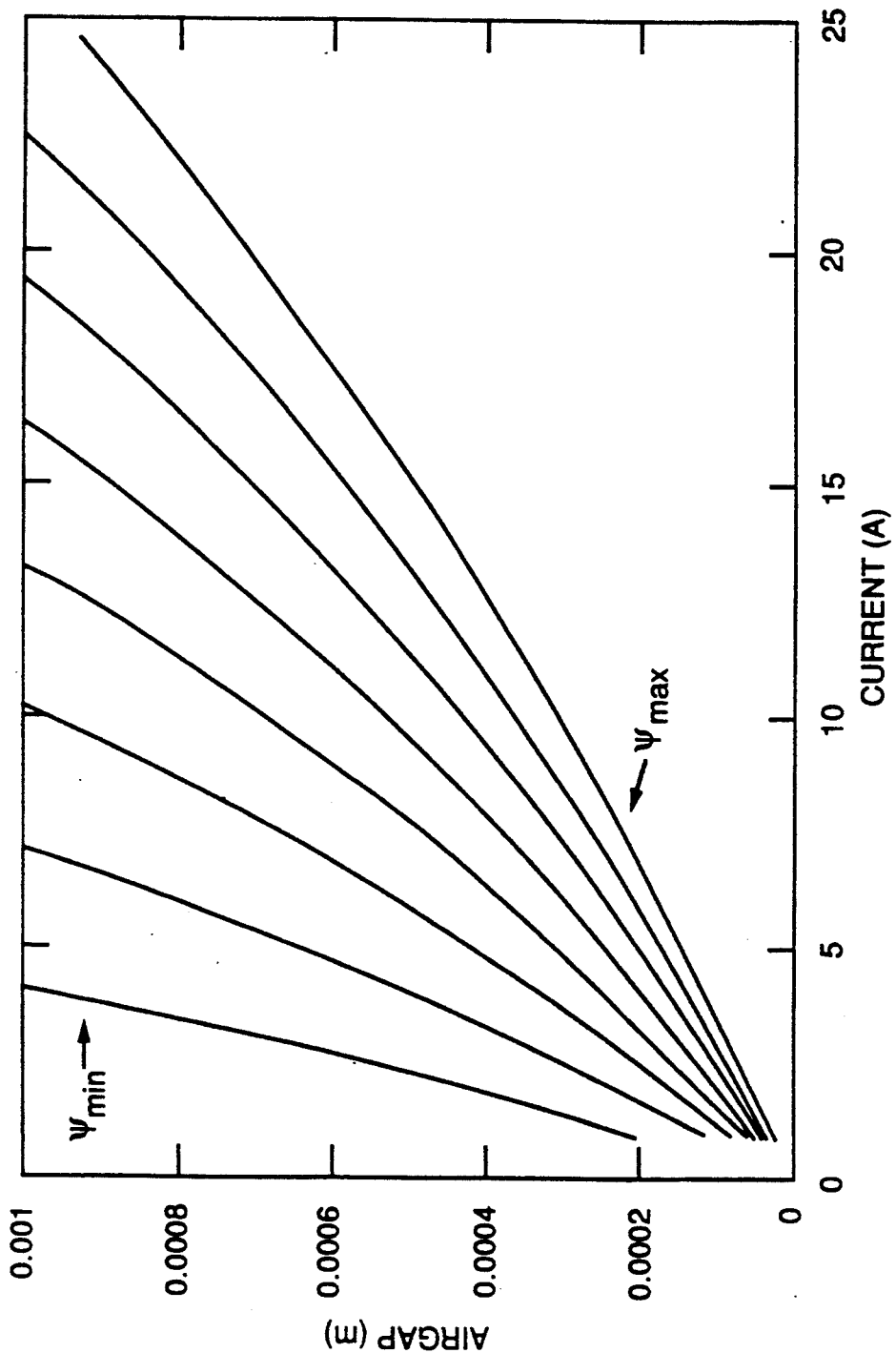

The effective air gap length is determined from the inherent magnetization characteristic using the measured current $I_{pole}$ and the estimated flux linkage $\psi$. In a preferred embodiment, this is accomplished by two-dimensional interpolation of stored magnetization curves, such as the graph of FIG. 4 illustrating air gap length versus current as a function of flux linkage. Alternatively, the air gap length may be determined using a functional reluctance model of the magnetic bearing flux path.

Effectively, in accordance with the present invention, the magnetic poles are used as force actuators and inductive feedback sensors, thereby eliminating the need for separate sensors. This advantageously reduces the parts count and increases the robustness and reliability of the active magnetic bearing system. For cyclic loading of a radial bearing subject to synchronous mass imbalance, the two force actuators per control axis exchange roles twice per rotor shaft revolution, with one actuator producing the desired force while the other is probed to determine the effective rotor position and air gap length.

As additional advantages of the air gap estimation method of the present invention, the air gap estimates are independent of air gap velocity and magnetic saturation.

The air gap estimation of the present invention has been described herein with specific reference to radial magnetic bearings. However, it is equally applicable to axial rotor position sensing in thrust bearing applications.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for sensing air gap length in an active magnetic bearing having a rotor and a stator including a plurality of pairs of electromagnetic force actuators, comprising:

magnetically separating said force actuators such that each has a substantially isolated flux path;

controlling said pairs of electromagnetic force actuators for mutually exclusive excitation of each actuator of each said pair;

applying a test voltage to the unexcited actuator of each said pair;

measuring the current I in said unexcited actuator a predetermined time after application of said test voltage;

using an integrator to estimate a flux linkage $\psi$ of said unexcited actuator a predetermined time after application of said test voltage according to $$\psi = \int (V - IR)dt,$$

where V represents the actuator voltage and R represents a actuator resistance;

resetting the integrator at zero current; and determining an effective air gap length from the estimated flux linkage and the measured current according to predetermined air gap length data as a function of current and flux linkage for said magnetic bearing.

2. The method of claim 1 wherein said integrator comprises an analog integrator.

3. The method of claim 1 wherein said integrator comprises a software integrator.

4. The method of claim 1 wherein said data is stored in microprocessor memory as a look-up table.

5. The method of claim 1 wherein said pairs of electromagnetic force actuators each comprise a pair of opposing stator pole-pairs.

6. Apparatus for estimating air gap length in an active magnetic bearing having a rotor mounted for rotation within a stator and for coupling to a shaft, said stator having a plurality of electromagnetic force actuators configured as opposing pairs, comprising:

non-magnetic flux barriers for magnetically separating adjacent electromagnetic force actuators such that each has a substantially isolated flux path, opposing pairs functioning as a magnetically isolated control axis, such that there are at least two control axes;

control means for controlling said pairs of electromagnetic force actuators for mutually exclusive excitation of each actuator of each said pair;

probing means for applying a test voltage to the unexcited actuator of each said pair;

current sensing means for measuring the current I in said unexcited actuator a predetermined time after application of said test voltage;

integrator means for estimating a flux linkage $\psi$ of said unexcited actuator according to $$\psi = \int (V - IR) dt,$$

where V represents the actuator voltage and R represents an actuator resistance;

resetting means for resetting said integrator means at zero flux linkage; and signal processing means for determining an effective air gap length from the estimated flux linkage and the measured current according to predetermined air gap length data as a function of current and flux linkage for said magnetic bearing.

7. The apparatus of claim 6 wherein said integrator means comprises an analog integrator.

8. The apparatus of claim 6 wherein said integrator means comprises a software integrator.

9. The apparatus of claim 6 wherein said data is stored in microprocessor memory as a look-up table.

10. The apparatus of claim 6 wherein said pairs of electromagnetic force actuators each comprise a pair of opposing stator pole-pairs.

* * * * *